United States Patent
Cheung

(10) Patent No.: US 6,687,769 B2
(45) Date of Patent: Feb. 3, 2004

(54) SERIAL PERIPHERAL INTERFACE WITH HIGH PERFORMANCE BUFFERING SCHEME

(75) Inventor: Hugo Cheung, Tucson, AZ (US)

(73) Assignee: Texas Instruments Incorporated, Dallas, TX (US)

( * ) Notice: Subject to any disclaimer, the term of this patent is extended or adjusted under 35 U.S.C. 154(b) by 417 days.

(21) Appl. No.: 09/810,994

(22) Filed: Mar. 16, 2001

(65) Prior Publication Data

US 2002/0133662 A1 Sep. 19, 2002

(51) Int. Cl.[7] .............................................. G06F 13/12
(52) U.S. Cl. ............................................ 710/52; 710/5
(58) Field of Search ........................... 710/52, 62, 310, 710/5; 370/428–429; 365/221, 239, 240

(56) References Cited

U.S. PATENT DOCUMENTS

| | | | |
|---|---|---|---|
| 4,816,996 A | | 3/1989 | Hill et al. |
| 5,199,105 A | * | 3/1993 | Michael ........................ 710/22 |
| 5,278,956 A | * | 1/1994 | Thomsen et al. ........... 711/167 |
| 5,493,570 A | * | 2/1996 | Hillman et al. ............. 370/516 |
| 5,587,953 A | * | 12/1996 | Chung ........................ 365/220 |
| 5,717,870 A | * | 2/1998 | Dobson ...................... 709/250 |
| 5,923,895 A | * | 7/1999 | Nookala et al. ................ 710/1 |
| 5,949,787 A | * | 9/1999 | Wegner et al. .............. 370/428 |

OTHER PUBLICATIONS

"Motorola's DSP568xx takes the low road: 3V, 120 mW, $10," Computer Design, Mar. 1996.

"Converting DSP56L811–Based Designs to the DSP56824," Motorola Technical Bulletin, Oct. 1, 1998, pp 1–14.

* cited by examiner

Primary Examiner—Kim Huynh
(74) Attorney, Agent, or Firm—W. Daniel Swayze, Jr.; W. James Brady; Frederick J. Telecky, Jr.

(57) ABSTRACT

The serial peripheral interface and high performance buffering scheme according to the present invention addresses many of the shortcomings of the prior art. In accordance with various aspects of the present invention, an improved high performance buffering scheme is provided with a serial peripheral interface (SPI) to enable microcontroller-based products and other components and devices to achieve a higher serial transmit and receive data rate. In accordance with an exemplary embodiment, a SPI comprises a single buffer having a high data rate, for example, at least the throughput of double buffer schemes, but without the increased size in logic area. To facilitate the throughput of data, the SPI single buffer can be configured with a queuing arrangement. The queuing arrangement for the SPI single buffer can comprise any queuing configuration, such as, for example, a circular queuing arrangement or a linear queuing arrangement. Through operation of the queuing arrangement, the SPI can be configured to provide for the receiving of new data in a register at substantially the same time that stored data can be transmitted to another device, thus the SPI can realize a high data rate. In accordance with an exemplary embodiment, a queuing arrangement is configured in a FIFO buffer having a pointer and counter arrangement. In addition the buffering scheme can provide a high data rate without requiring frequent CPU polling or high interrupt overhead wherein the buffering scheme is configured with an interrupt configuration for identifying when data is ready for transmitting or for reading by the CPU.

12 Claims, 4 Drawing Sheets

SERIAL PERIPHERAL INTERFACE WITH HIGH PERFORMANCE BUFFERING SCHEME

FIELD OF THE INVENTION

The present invention relates to a serial peripheral interface for use in microcontroller-based products. More particularly, the present invention relates to a high performance buffering scheme for a serial peripheral interface that facilitates high data transmission rates between microprocessors, components and other devices.

BACKGROUND OF THE INVENTION

The demand for higher performance, microcontroller-based products for use in communication and processing applications continues to increase rapidly. As a result, microcontroller-based product manufacturers are requiring for the components and devices within these products to be continually improved to meet the design requirements of a myriad of emerging audio, video and imaging applications.

These microcontroller-based products use various types of processors, for example, general purpose microprocessors for controlling the logic of various digital devices, such as clock radios, microwave ovens, digital video recorders and the like, and special purpose microprocessors, such as math coprocessors for mathematical computations, or digital signal processors used in manipulating various types of information, including sound, imaging and video information. For the transmitting and receiving of data between various devices and components, microprocessors and other devices utilize various types of serial interfaces. One such type of interface definition typically used is the serial peripheral interface (SPI). In addition, for the temporary storage of data, for example, to permit the microprocessors to manipulate the data before transferring the data through the SPI to another device, the microprocessors generally utilize one or more buffers. These buffers are configured with the SPI's to enable the processors to transmit and receive data to and from the buffers as needed in an application.

With reference to FIG. 1, an SPI configuration 100, which comprises a synchronous, three-wire interface, can be generally configured within a master device 102, such as a microprocessor device, and a slave device 104, such as an analog-to-digital converter or similar peripheral device, to permit the two devices to communicate data in between. In master device 102, the SPI comprises a buffering scheme including a master shift register 106. In addition, master device 102 includes a clock generator 108. The least significant bit of master shift register 106 includes an input connected to a master out/slave in (MOSI) pin and the most significant bit of master shift register 106 includes an output connected to a master in/slave out (MISO) pin. The clock generator 108 includes an output connected to the clock input of master shift register 106 and to the S clock (SCK) pin.

Meanwhile, in slave device 104, the SPI comprises a buffering scheme including a slave shift register 110. The least significant bit of slave shift register 110 includes an input connected to a MISO pin and the most significant bit of slave shift register 110 includes an output connected to a MOSI pin. The clock input of slave shift register 110 is connected to an SCK pin. Although one slave device 104 is illustrated, more than one slave device can be coupled to master device 102. In addition, the respective MOSI, MISO, and SCK pins of master device 102 and slave device 104 can be connected together.

Both master device 102 and slave device 104 include a separate data path to permit entering data to be transmitted into and retrieving data from shift registers 106 and 110. Further, both master device 102 and slave device 104 typically have status register bits for indicating the current status of the interface and control register bits for configuring the interface. In addition, one or more chip select signals 112 of master device 102 and connected to enable various inputs of slave device 104.

Various drawbacks exists for such an SPI interface. For example, a single data transfer is generally limited to the number of bits which can be held in the SPI shift register, for example, 8 bits. On each occasion that a data transfer is commenced, the CPU must write the byte to be transferred to the appropriate shift register and then assert a control bit to commence the serial transfer of data or the reading of received data. Thus, the data throughput of such an SPI is limited.

Further, such an SPI configuration requires a relatively high degree of intervention from the central processing unit (CPU) or other master controller device, instead of permitting the CPU to be servicing demands from a plurality of other slave components and devices, i.e., the SPI requires high interrupt overhead within the CPU. For example, once a data transfer is complete, the SPI typically interrupts the CPU to demand further servicing, such as the loading of a new byte of data for transmission, or the CPU may be configured for continually polling the SPI to determine if such further servicing is required. As a result, the required CPU intervention for each byte transferred is substantial and the frequency with which the CPU must dedicate its resources to servicing the SPI is quite high.

Various attempts have been made at addressing the various problems above, such as a lower than desired data rate and a higher CPU overhead. Some attempts have included the increasing in size of the buffers to obtain a higher data rate. For example, with reference to FIG. 2, a double buffering configuration 202 incorporated within an SPI scheme 200 includes an 8-bit receive data buffer 204 for the temporary receiving of data and a dual purpose, transmit/receive shift register 206. Unfortunately, the increased double buffer size results in increased logic area, i.e., this SPI buffering scheme requires additional logic to be implemented to make operational, resulting in a higher bit rate, but also resulting in greater logic area requirements. In addition, more power consumption is required for such a double buffering arrangement. Still further, this SPI buffering scheme also results in very high overhead since the CPU needs to read the data at least every two bytes received, because the buffer can only handle one byte at a time.

For example, once a single transaction is completed, SPI scheme 200 must have the next data ready for the CPU to write the data to transmit shift register 206 in buffering configuration 202, i.e., since the CPU writes the data on every transaction, the SPI must be configured to transmit the data at the same time. Accordingly, since the CPU must write every single line of data, the CPU is required to service the SPI at a high frequency, instead of being able to operate or service other devices. Further, since the CPU has to frequently poll the peripheral devices, the resulting bit rate is fairly low, e.g., less than 1 Mhz.

Other attempts at solving the above problems have included trying to increase the CPU clock frequencies to increase the SPI bit rate; however, such configurations have high costs due to the need for more expensive CPU cores. In other words, prior art attempts to achieve a high performance SPI have resulted in an improvement of the performance of the SPI with respect to one aspect or problem, but have resulted to the detriment of the performance of the SPI with respect to other aspects or problems.

Accordingly, a need exists for an improved, high performance buffering scheme for a serial peripheral interface to provide an increased serial transmit and receive data bit rate, while minimizing the logic area. In addition, a need exists for an improved buffering scheme for reducing the amount of CPU polling or interrupt overhead required.

SUMMARY OF THE INVENTION

The serial peripheral interface and high performance buffering scheme according to the present invention addresses many of the shortcomings of the prior art. In accordance with various aspects of the present invention, an improved high performance buffering scheme is provided with a serial peripheral interface (SPI) to enable microcontroller-based products and other components and devices to achieve a higher serial transmit and receive data rate. In accordance with an exemplary embodiment, a SPI comprises a single buffer having a high data rate, for example, at least the throughput of double buffer schemes, but without the increased size in logic area. To facilitate the throughput of data, the SPI single buffer can be configured with a queuing arrangement.

In accordance with an exemplary embodiment, a queuing arrangement for the SPI single buffer can comprise any queuing configuration, such as, for example, a circular queuing arrangement or a linear queuing arrangement. Through operation of the queuing arrangement, the SPI can be configured to provide for the receiving of new data in a register at substantially the same time that stored data can be transmitted to another device, thus the SPI can realize a high data rate. In accordance with an exemplary embodiment, a queuing arrangement is configured in a FIFO buffer having a pointer and counter arrangement.

In accordance with another aspect of the present invention, the buffering scheme can provide a high data rate without requiring frequent CPU polling or high interrupt overhead. In accordance with this aspect of the present invention, the buffering scheme can be configured with an interrupt configuration for identifying when data is ready for transmitting or for reading by the CPU.

BRIEF DESCRIPTION OF THE DRAWINGS

A more complete understanding of the present invention may be derived by referring to the detailed description and claims when considered in connection with the Figures, where like reference numbers refer to similar elements throughout the Figures, and:

DETAILED DESCRIPTION OF EXEMPLARY EMBODIMENTS OF THE INVENTION

Figure 1:
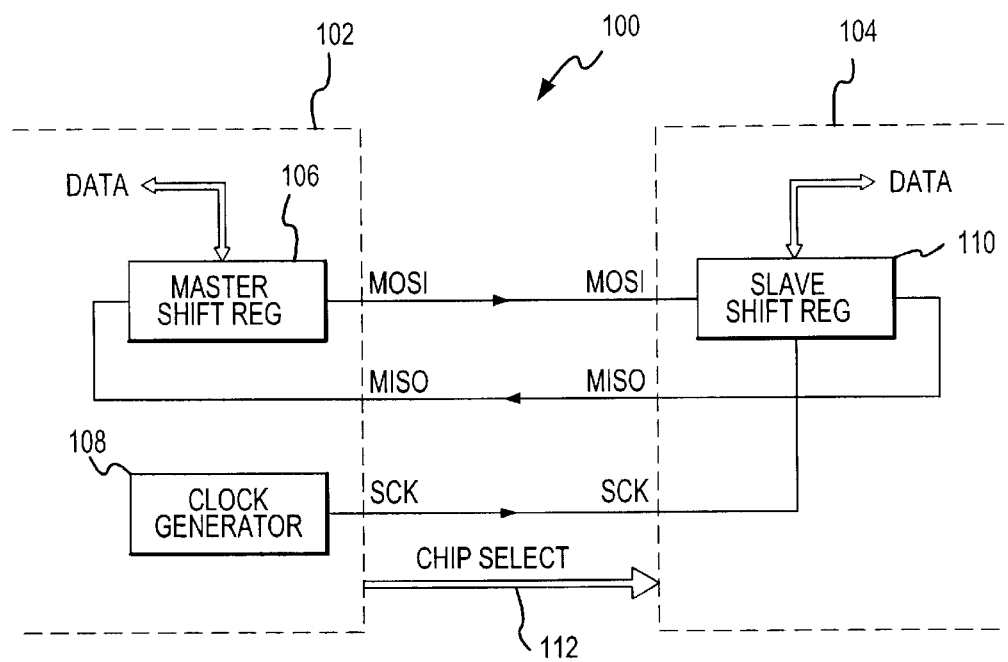
FIG. 1 illustrates a block diagram of a prior art serial peripheral interface for master and slave devices.
Figure 2:
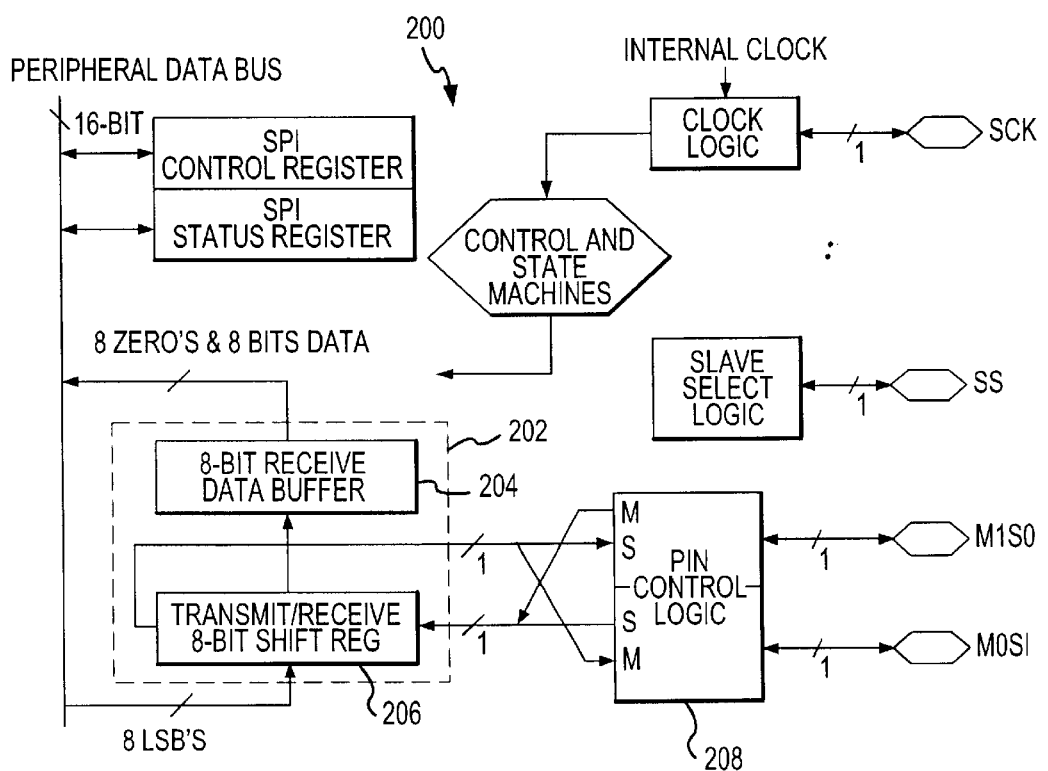
FIG. 2 illustrates a block diagram of a prior art double buffering scheme for a serial peripheral interface.

The present invention may be described herein in terms of various functional components and various processing steps. It should be appreciated that such functional components may be realized by any number of hardware or structural components configured to perform the specified functions. For example, the present invention may employ various integrated components, e.g., buffers, voltage and current references, memory components and the like, comprised of various electrical devices, e.g., resistors, transistors, capacitors, diodes or other devices, whose values may be suitably configured for various intended purposes. In addition, the present invention may be practiced in any microcontroller-based application. Such general applications that may be appreciated by those skilled in the art in light of the present disclosure are not described in detail herein. However for purposes of illustration only, exemplary embodiments of the present invention will be described herein in connection with a SPI interface for a master device, such as a microprocessor, or a slave device, such as an A/D converter. Further, it should be noted that while various components may be suitably coupled or connected to other components within exemplary circuits, such connections and couplings can be realized by direct connection between components, or by connection through other components and devices located therebetween.

As discussed above, previous attempts for providing serial peripheral interfaces configured for high data rates have generally included the use of larger buffers, e.g., double buffer configurations, and have resulted in increased logic area, higher power consumption, and higher CPU overhead. However, in accordance with the present invention, a serial peripheral interface (SPI) has been configured with a high performance buffering scheme that suitably provides a high data rate without increasing the logic area, power consumption and CPU overhead required.

In accordance with an exemplary embodiment of the present invention, a serial peripheral interface comprises a single buffer configuration. While the single buffer can comprise various arrangements, in accordance with an exemplary embodiment, the single buffer comprises a queuing configuration. For example, the single buffer can be configured in a circular configuration, such as, for example, a first in/first out (FIFO) buffer as illustrated below in an exemplary embodiment. Further, the single buffer can be configured in a linear queuing configuration. Moreover, the size of the single buffer can comprise any number of bytes, depending on any given design criteria. Further, the single buffer can be suitably configured in any other queuing configuration, now known or hereinafter devised.

In addition, an exemplary buffer arrangement can be configured to provided a more reliable communication path for the SPI. In accordance with this exemplary embodiment, the SPI comprises a transmit shift register and a receive shift register within a single buffer. However, while the single buffer comprises two registers, the area or memory size for the single buffer is smaller than double buffering schemes. For example, in a double buffer scheme such as described above, an increase in memory size from one byte to two bytes results in an increase of four bytes overall, i.e., two bytes for each of the two buffers. However, in accordance with the exemplary embodiment, an increase from a single byte to two bytes in the single buffer results in only an increase of two bytes overall. However, as will be described in more detail below, an exemplary buffer scheme of the present invention can provide the same data rate performance as prior art buffering schemes with only half of the memory size. Moreover, the difference in area or memory size becomes more noticeable with an increase in data rates, e.g., at rates of 12 Mhz or more which can be attainable by various exemplary embodiments of the present invention, which are extremely difficult if not impossible for prior art buffering schemes to obtain.

Figure 3:
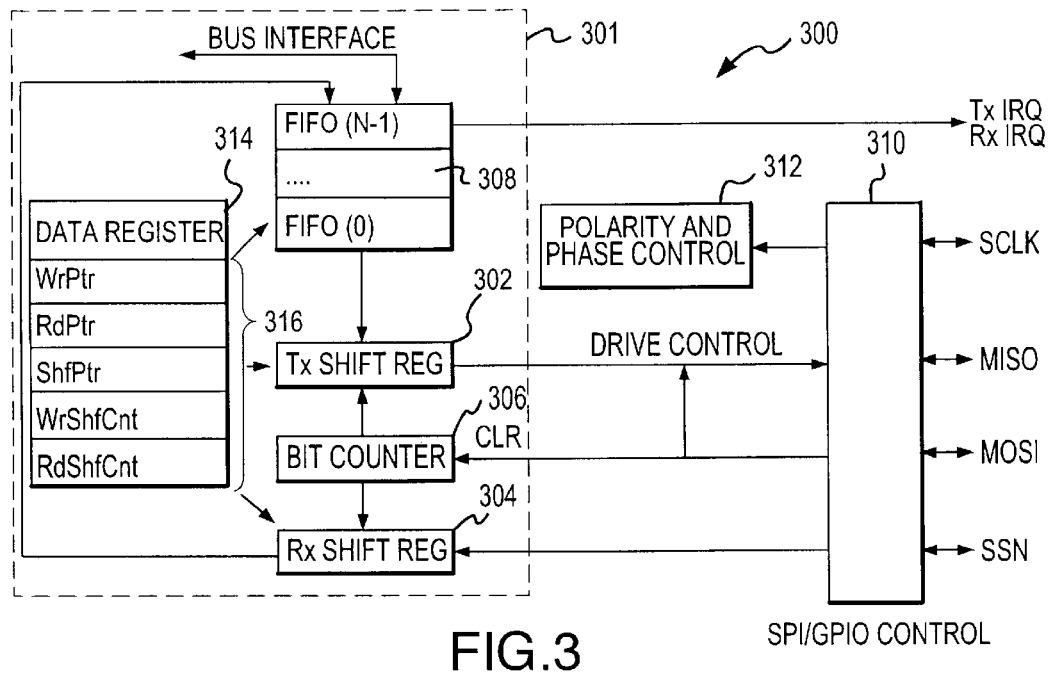
FIG. 3 illustrates a schematic diagram of an exemplary buffering configuration for a serial peripheral interface in accordance with the present invention.

With reference to FIG. 3, an exemplary SPI configuration 300 is illustrated. In accordance with this exemplary embodiment, SPI configuration 300 comprises an SPI configured in a master/slave arrangement, i.e., SPI configuration 300 can be programmed in master mode or slave mode. For example, an exemplary SPI configuration 300 can be suitably implemented within a master device, such as a microprocessor, or a slave device, such as an A/D converter.

In addition, SPI configuration 300 suitably comprises a single buffer configuration 301 configured for facilitating the providing of a high data rate without increasing the logic area. In accordance with the exemplary embodiment, single buffer 301 comprises a transmit shift register (Tx Shift Reg) 302 and a receive shift register (Rx Shift Reg) 304. In addition, single buffer 301 can be configured in a queuing arrangement, for example, a FIFO buffer arrangement 308. In accordance with this exemplary embodiment, FIFO buffer arrangement 308 can comprise various sizes, for example, from FIFO (0) to FIFO (N−1), where N=2 through 128 or more, i.e., a FIFO buffer can be configured for a data storage area of 2 bytes to 128 bytes or more.

As discussed above, the single buffer scheme for the SPI configuration 300 can provide high data rates with only half of the size of double buffering schemes, approximately double the data rate using the same buffer area as double buffering schemes, or an increased data rate using less buffer area than double buffering schemes. In accordance with another exemplary embodiment of the present invention, an exemplary SPI buffering scheme includes queuing configuration comprising a counter/pointer arrangement for facilitating the throughput of data through the SPI as well as for reducing the CPU overhead.

In accordance with such an exemplary embodiment, with reference again to FIG. 3, single buffer 301 includes an exemplary counter/pointer arrangement 316 comprising three pointers configured for designating the locations in the FIFO buffer 308 for writing and receiving of data. For example, one pointer can be used to indicate the location where the CPU will write the data to be transmitted (WrPtr), another pointer can be used to identify the location where the received data can be stored and read by the CPU (RdPtr), and a third pointer can be used to identify the location where the data to be transmitted is located and the location where the received data will be stored after shifting of the registers is completed (ShfPtr). In addition, counter/pointer arrangement can comprise two counters configured to suitably track the number of bytes of data that have been received (RdShfCnt) and the number of bytes of data that need to be transmitted (WrShfCnt). Moreover, additional or fewer counters and pointers can be implemented depending on any number of design criteria. As will be described in more detail below, the use of the counters and pointers can provide a buffering scheme facilitating high data rates without increasing CPU overhead.

In addition, single buffer 301 can include one or more data registers 314 which are configured with FIFO buffer 308 for the storing of data for further processing and use. Data register 314 is configured to permit data to be written to by a CPU, and for data to be read from by a CPU. Data register 314 can be configured in various sizes to hold various amounts of data, for example, a few bits, a single byte, or several bytes or more.

Still further, single buffer 301 can comprise various other components configured to facilitate operations of SPI 300. For example, single buffer 301 can comprise a bit counter 306 which is configured to suitably track the number of bits transmitted or received. As a result, bit counter 306 can facilitate confirmation by single buffer 301 that a complete transmission or receipt of data to and from another device as been accomplished.

In addition to single buffer 301, SPI configuration 300 can include various other elements to provide a high performance operating system. In accordance with an exemplary embodiment, to facilitate a reduction in the polling of the microprocessor or CPU, SPI configuration 300 can be configured with interrupt signals to indicate to the CPU that data is ready for transmitting, or that buffer locations are available for receiving data. For example, SPI configuration 300 can be configured to suitably include two interrupt requests, such as a transmit interrupt request (TxIRQ) and a receive interrupt request (RxIRQ). Each of interrupt requests TxIRQ and RxIRQ can be suitably configured to provide a signal informing a master or slave device that SPI configuration 300 is ready to transmit or receive data. In addition, as will be described in more detail below, interrupt requests TxIRQ and RxIRQ can be configured with a threshold value that determines when the CPU should intervene and facilitate the transmitting or receiving of data through SPI configuration 300.

Further, SPI configuration 300 comprises an SPI/GPIO control component 310 configured for communication with another device. Control component 310 suitably includes interface pins which can be configured as general purpose input/output pins (GPIO), for example, an SPI clock (SCLK) pin, a master in/slave out (MISO) pin, a master out/slave in (MOSI) pin, and an SPI select/active low (SSN) pin. Additional pins can also be included within control component 310 for other interfacing purposes.

As a result of queuing configuration within single buffer 301, SPI configuration 300 can provide a high data rate without increasing the logic area as required by prior art buffering schemes. In addition, single buffer 301 can be configured in any queuing arrangement configured to provide a high data rate, for example, circular queuing arrangements, or linear queuing arrangements. To facilitate an explanation of the operation of an exemplary queuing arrangement for single buffer 301, an exemplary circular buffer is illustrated and discussed below.

Figure 4:
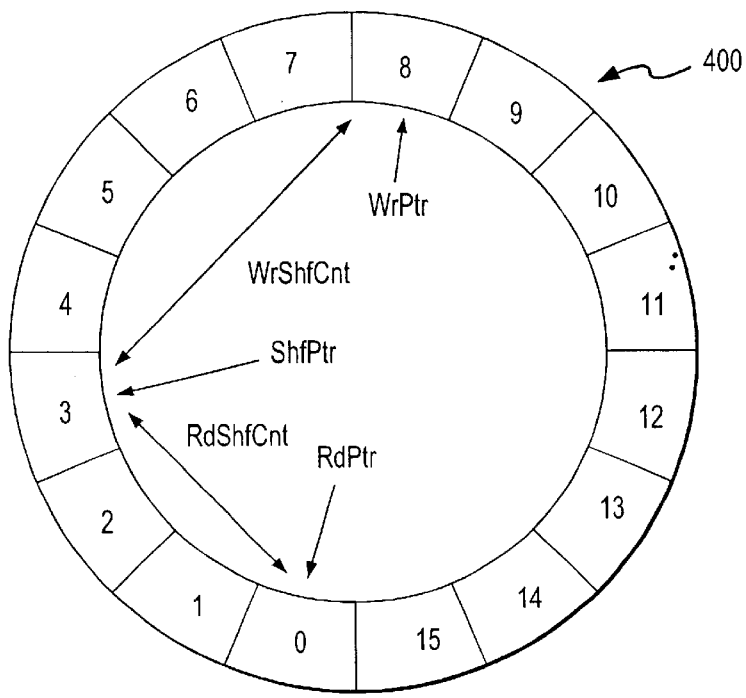
FIG. 4 illustrates a schematic diagram of an exemplary buffering scheme in accordance with the present invention.

With reference to FIG. 4, an exemplary FIFO buffer scheme 400 having a pointer/counter arrangement is illustrated. In accordance with this exemplary embodiment, the FIFO buffer scheme 400 comprises three pointers, for example, a write pointer (WrPtr), a read pointer (RdPtr), and a shift pointer (ShfPtr), and two counters, for example, a write shift counter (WrShfCnt) and a read shift counter (RdShfCnt). The range of values for these pointers and counters is from 0 to N, where N=2 through 32 or more. In the exemplary embodiment, N=16, i.e., the SPI buffer is configured for 16 byte operation.

In accordance with this exemplary embodiment, the WrPtr pointer comprises the location of the FIFO buffer 400 that the CPU will write to during data transmission, and is configured to increment after the CPU writes to the SPI data register. The RdPtr pointer comprises the location of the FIFO buffer 400 that the CPU will read from during data transmission, and is configured to increment after the CPU reads from the SPI data register. The ShfPtr pointer comprises the location that the shift registers, for example, the transmit shift register 302 and the receive transmit register 304, will read from and write to when the registers are receiving or transmitting data. In the illustration of FIG. 4, WrPtr pointer has a value of 8, RdPtr pointer has a value of 0, and ShfPtr pointer has a value of 3.

As for the counters, the WrShfCnt counter is configured to provide the count number that the WrPtr advances the ShfPtr during transmission of data, e.g., WrShfCnt counter has a value of 00101B (5 decimal) in the illustration of FIG. 4, and indicates the number of bytes remaining for transmission. In addition, WrShfCnt counter is configured such that when WrShfCnt counter has a value of N, e.g., 10000B (16 decimal), writing to the SPI data register will not increment the WrShfCnt counter value. As a result, any write operation will operate to overwrite the previous written value.

Meanwhile, the RdShfCnt counter is configured to provide the count number that the ShfPtr advances the RdPtr during receipt of data, e.g., RdShfCnt counter has a value of 00011B (3 decimal) in the illustration of FIG. 4, and indicates whether or not that the SPI has received data. In addition, RdShfCnt counter is configured such that when RdShfCnt counter has a value of zero, e.g., 00000B (0 decimal), reading from the SPI data register will not decrement the RdShfCnt counter value. As a result, any read operation will operate to re-read the previous read value.

In accordance with another aspect of the present invention, the buffering scheme is configured for reducing the amount of CPU polling or interrupt overhead required by prior art buffering schemes. As discussed above, prior art buffering schemes typically require high interrupt overhead due to the need to frequently interrupt the CPU. For example, for double buffer schemes, the CPU has to be configured to service both buffers which requires additional interrupt overhead. Further, since such prior art buffers generally do not know when data is ready for transmitting or when data is ready for receiving, these prior art buffers must frequently poll the dual buffers to identify the appropriate time to transmit or receive data, whether or not the dual buffers are ready to transmit or receive data.

However, through use of the exemplary pointer and counter configuration, FIFO buffer scheme 400 is configured to permit SPI configuration 300 to suitably transmit data until a threshold level of received bytes is left for sending, e.g, three bytes or less. This threshold level can be suitably configured to different levels, e.g., one, two, four or more, or can be completely disabled as desired. Upon reaching the threshold level of available bytes, FIFO buffer 400 can be configured to interrupt the CPU and request additional data. Accordingly, the CPU could again begin to fill FIFO buffer with data to a desired level, e.g., until 16 bytes are received and stored, or any number desired. In addition, once the FIFO buffer is approximately full, for example, only a few registers are available for the filling of data, FIFO buffer scheme 400 can be configured to interrupt the CPU to indicate that data is ready for transmitting.

For example, with reference to FIG. 4, if the threshold level of bytes to be received before interrupting the CPU is two bytes, no interruption of the CPU will occur since the RdShfCnt counter equals three, i.e., three bytes have been received. However, if further data is transmitted, and the counters and pointers are properly decremented such that two or less bytes of data are available, FIFO buffer scheme 400 can be suitably configured to interrupt the CPU to request additional data. Moreover, an upper threshold level of bytes can be provided such that when the FIFO buffer is full, or approaching a full buffer status, e.g., one or two bytes of area available for filling of data, FIFO buffer scheme 400 can be configured to interrupt the CPU to request the transmission of data.

Thus, in accordance with an exemplary embodiment, both the WrShfCnt counter and the RdShfCnt counter can be configured to operate with interrupt request signals, for example, the transmit interrupt request (TxIRQ) and the receive interrupt request (RxIRQ), which can provide a signal indicating that SPI buffer scheme is ready to transmit or receive data. For example, in the event that WrShfCnt is less than or equal to the value of transmit interrupt request (TxIRQ), the signal and status flag of the transmit interrupt request (TxIRQ) will be activated. Further, in the event that RdShfCnt is larger than or equal to the value of receive interrupt request (RxIRQ), the signal and status flag of the receive interrupt request (RxIRQ) will be activated. In addition, the values of the TxIRQ and RxIRQ can be configured at different levels depending on the desired intervention of the CPU.

While it should be noted that the above exemplary embodiment can provide an interrupt feature to prevent excessive polling of the CPU, it should be noted that the CPU can continue to provide a polling function in addition to the interrupt features of CPI configuration 300. In other words, CPI configuration 300 can be configured with only the use of automatic CPU polling as desired, without the use of automatic CPU polling and instead use of only the interrupt features, e.g., TxIRQ and RxIRQ, or with both CPU polling and interrupt features incorporated within.

Figure 5:
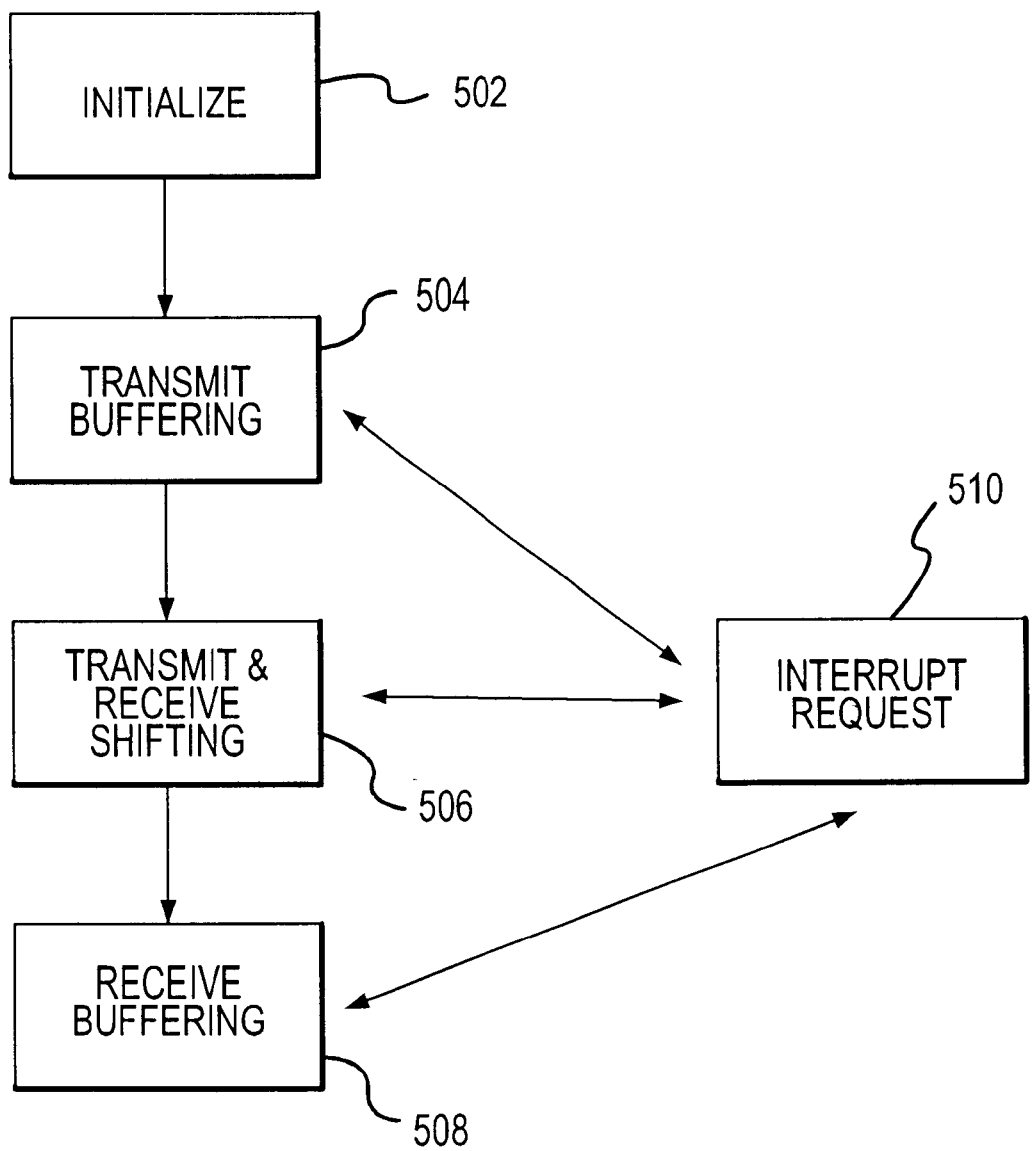
FIG. 5 illustrates a flow chart of an exemplary buffering scheme in accordance with the present invention.

To further illustrate the operation of an exemplary SPI configuration in accordance with the present invention, an exemplary operation sequence 500 for a buffering scheme is illustrated with reference to FIG. 5, and additional reference again to FIGS. 3 and 4. In accordance with this example, prior to operation, the FIFO buffer 400 is empty and without remaining data to be transmitted or received, and all counters and pointers are configured to the same location, for example, all pointers and counters could be pointing to zero (0000B or 0 decimal). During an initialization step 502, the CPU will write to an SPI data register, for example, SPI data register 314, and the SPI configuration will facilitate the writing of data into the location of FIFO buffer 400 designated by the WrPtr pointer. Thereafter, in a transmit buffering step 504, the WrPtr pointer is suitably incremented to prevent the next byte to be transmitted from overwriting the previous written byte, while the WrShfCnt counter is incremented to keep track of the number of bytes available for transmission For example, in the illustration of FIG. 4, with WrPtr equal to 8 decimal, and ShfPtr equal to 3 decimal, WrShfCnt is equal to 5 decimal, indicating 5 bytes are available for writing.

Upon the writing of data to an SPI data register in step 502, and incrementing of the WrPtr pointer and the WrShfCnt counter in step 504, a transmit and receive shifting step 506 can be provided. In step 506, the SPI configuration 300 can begin transmitting the data by reading the data from the ShfPtr location in the buffer, and then writing the data to the transmit shift register 302. Upon completion of transferring of data from FIFO buffer 308 to the transmit shift register 302, shifting of the registers can suitably occur.

At the same time that transmission of data is being completed, or substantially immediately after transmission of data, for example, within one clock cycle, a new byte of data can be suitably received and stored in the receive shift register 304, i.e., stored in the location of FIFO buffer 400 designated by the RdPtr pointer. Accordingly, by providing a buffering scheme that permits data to be received substantially at the same time, or immediately after, the transmitting of data, a high data rate can be obtained, for example, up to 12 Mhz or more.

After the transmission and receiving of data in steps 504 and 506, a receive buffering step 508 can be suitably provided. In step 508, the ShfPtr pointer can again be incremented, and thus point to a new location in the FIFO buffer 400. In addition, the RdShfCnt can also be suitably incremented to indicate that the SPI configuration 300 has received another byte of data.

As discussed above, the SPI configuration can also be configured with FIFO buffer 308 to suitably interrupt the CPU if data is ready for transmitting, e.g., if the FIFO buffer is nearly full or full of data, or if the FIFO buffer is ready to receive data, e.g., if the buffer is nearly empty or empty. Accordingly, an interrupt step request 510 can be suitably provided. In step 510, if the programmable interrupt request Rx IRQ is set to interrupt the CPU when one byte has been received, then the CPU can suitably read the SPI data register. However, the threshold value of interrupt request RxIRQ could also be configured to delay interrupt of the CPU and have the CPU intervene only when two, three or more bytes have been received. Upon interruption of the CPU, the SPI configuration 300 can then make sure that the CPU can receive the data in the location of FIFO buffer 400 designated by the RdPtr pointer. After the data is received, the RdPtr pointer can be suitably increased, and the RdShfCnt can be decreased, which indicates the amount of new data that is available for the CPU. For example, if the receive interrupt request RxIRQ is set to a threshold value of one, and the CPU reads the data designated by the RdPtr pointer, the RdShfCnt is decreased to zero, which indicates that no new data is available for the CPU.

While step 510 can be configured to occur after receive buffering step 508, interrupt request step 510 can also be configured to occur during step 508. In addition, interrupt request step 510 can also be configured to occur prior to receive buffering step 508, for example, before or during transmit buffering step 504, or after transmit buffering step 504. Accordingly, interrupt request step 510 can occur any time during the operation of SPI configuration 300 when it is desirable to interrupt the CPU to initiate the transmitting or receiving of data.

Accordingly, FIFO buffer 400 can be configured to essentially overwrite a buffer register which had the data that was transmitted, i.e., the function of FIFO buffer 400 can be configured to essentially transmit and receive data at substantially the same time to provide the throughput of at least, if not greater than, larger sized buffers. In addition, while the above operation provides an example of a single byte being transmitted and received, including the proper incrementing of pointers and counters, and shifting of registers, other variations can be realized. For example, 16 bytes could be written to FIFO buffer 400 prior to any transmission of the data. Moreover, at substantially the same time that, or immediately thereafter, these bytes are being transmitted, 16 bytes could also be suitably received in the FIFO buffer 400 due to the appropriate incrementing and decrementing of the WrPtr pointer and RdPtr pointer. Moreover, any variation up to N bytes, or any variation in between can be realized, for example, four bytes transmitted and four bytes received, or six bytes transmitted, and three bytes received. Such an operation effectively results in the overwriting of data to increase the throughput of the FIFO buffer, e.g., the FIFO buffer is configured to effectively facilitate the sending and receiving of data at the same time.

It should also be noted that the various steps in the exemplary operation sequence 500 can be suitably arranged in alternate ways, and the above embodiment is for illustration purposes only. For example, after transmit buffering step 504, sequence 500 could suitably return to initialization step 502 before proceeding to the transmit and receive shifting step 506. Further, transmit buffering step 504 could be repeated several times before proceeding to any subsequent step. Moreover, any other like variations of any of the other steps in sequence 500 that are configured to provide high data rates can be implemented.

Figure 6:
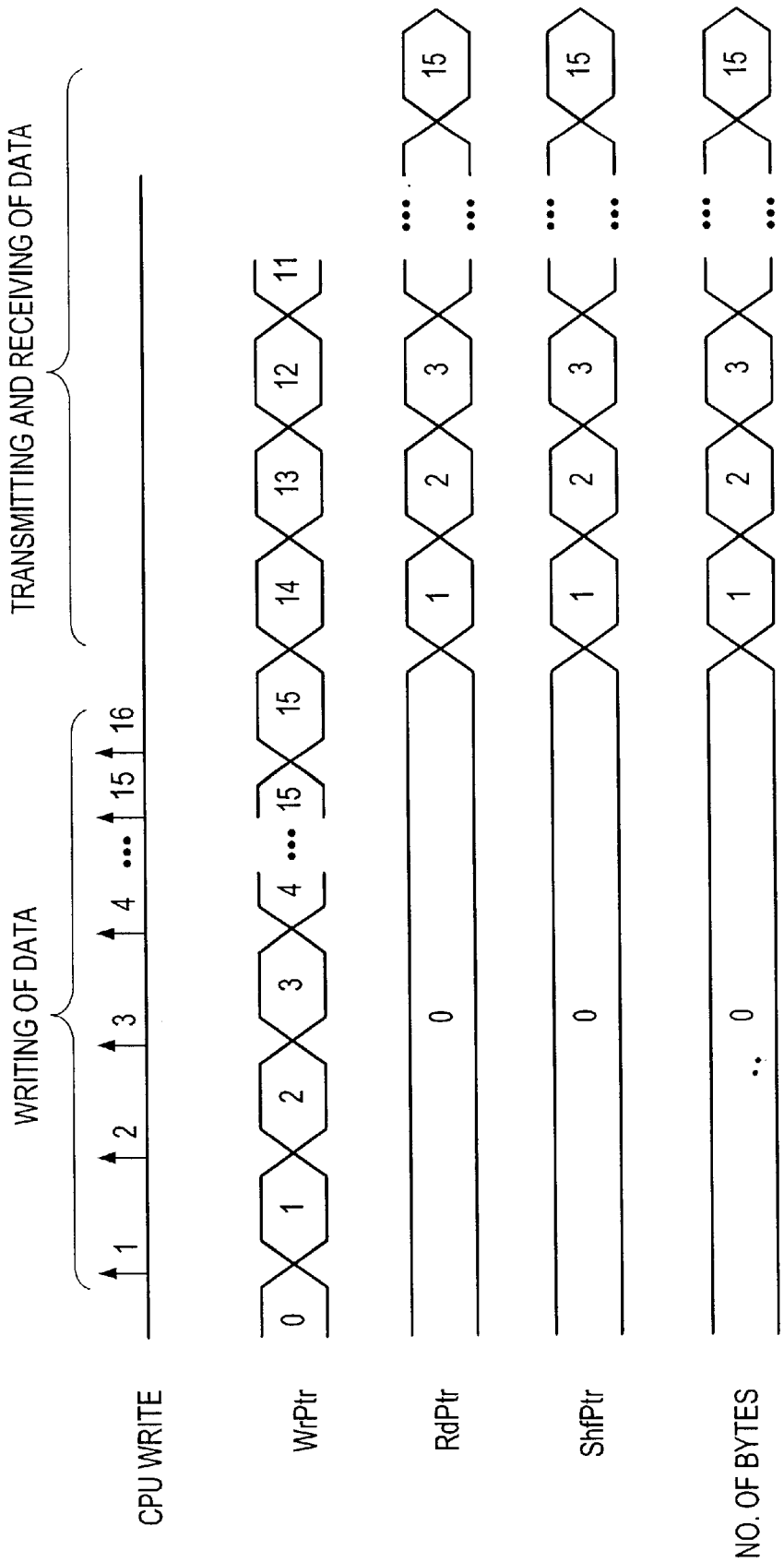
FIG. 6 illustrates an exemplary timing diagram demonstrating the transmission and receipt of data in an exemplary buffering scheme in accordance with the present invention.

With reference to FIG. 6, an exemplary timing diagram illustrates a data write, transmit and read and transmission sequence. For example, for a case of a FIFO buffer having 16 bytes available, i.e, N=16, and in which the CPU has written 16 bytes of data to the designated FIFO buffer location, the WrPtr will suitably increment from zero to fifteen (15), with WrPtr remaining at decimal fifteen (15) location since there are no further storage locations. In the event that the CPU writes additional data, that data can also be written to the location designated by WrPtr at a value of decimal fifteen (15). The remaining RdPtr and ShfPtr pointers and the number of bytes available for reading remain at zero during this writing of data. In addition, although not shown, the WrShfCnt counter can also suitably increment from zero to fifteen (15), which would indicate that the FIFO buffer is full. At this point, the SPI is ready to begin transmitting of the written data and receiving of new data.

As the SPI has transmitted the data, the RdPtr pointer will increment as a new byte is received from the CPU. Further, the ShfPtr pointer is also increased to indicate the register for which the newly received byte can be written. At the same time, the WrPtr pointer will suitably decrease for every byte that is transmitted. This process can continue as each of the available bytes are transmitted, and each of the buffer locations have been read by the CPU, until the ShfPtr pointer and RdPtr pointer equal fifteen (15) with the effect that the FIFO buffer can suitably have data transmitted and received at the same time. At this point, or at any other desired time when the SPI desires to have data read by the CPU, the SPI could interrupt the CPU to have the CPU to begin reading the data. As a result, the SPI is selectively configured to determine how many bytes are to be read, to be written and to be sent, as well as how many of each category should be stored in FIFO buffer before the CPU is interrupted.

Accordingly, the exemplary SPI configuration 300 suitably utilizes half the area for essentially the same data rate as double buffer schemes. Further, if SPI configuration 300 utilizes essentially the same area, at least double the data rate of prior art double buffer schemes can be obtained. For example, if a double buffer scheme utilizes a two-byte-by-two-byte scheme, e.g., two bytes for a receive buffer and two bytes for a transmit buffer, the data rate for the double buffer is limited due to the prior art double buffer being able to transmit only two bytes and read two bytes at a time. However, if the SPI configuration 300 is configured such that FIFO buffer 400 has the same silicon area, for example, a four-byte buffer, FIFO buffer 400 can suitably write the data at twice the rate, i.e., at four bytes at a time, and can shift and send the data out at four bytes at a time. Moreover, if the SPI configuration 300 is increased to greater than half the area, but less than the same size area, as double buffer schemes, the SPI configuration can provide both an increased data rate and a smaller area.

The present invention has been described above with reference to an exemplary embodiment. However, those skilled in the art will recognize that changes and modifications may be made to the exemplary embodiment without departing from the scope of the present invention. For example, the various components may be implemented in alternate ways, such as varying or alternating the steps in different orders in writing or reading of data. These alternatives can be suitably selected depending upon the particular application or in consideration of any number of factors associated with the operation of the system. In addition, the techniques described herein may be extended or modified for use with other types of devices, in addition to the microprocessor and slave devices described above. For example, the shifting and/or queuing techniques described above could be applied to other devices, such as the handling of data in an ink jet printer. These and other changes or modifications are intended to be included within the scope of the present invention, as expressed in the following claims.

What is claimed is:

1. A serial peripheral interface device configured for providing a high performance buffering scheme for transmitting data to and receiving data from another peripheral device, said serial peripheral interface device comprising:

an input/output control device for interfacing with the other peripheral device; and a single buffer having a transmit shift register, a receive shift register, a data register and a queuing arrangement, wherein said queuing arrangement comprises a pointer/counter arrangement and is configured to provide for the receiving of new data in said data register at substantially the same time as stored data is transmitted from said data register, wherein said queuing arrangement comprises:

a write pointer configured to indicate a location in said single buffer where a CPU can write data to be transmitted;

a read pointer configured to identify a location in said single buffer where any received data can be stored for reading by the CPU; and a shift pointer configured to identify a location for data to be transmitted and a location where the received data will be stored after shifting of any registers is completed.

2. A serial peripheral interface device according to claim 1, wherein said queuing arrangement comprises a circular queuing arrangement.

3. A serial peripheral interface device according to claim 1, wherein said queuing arrangement comprises a linear queuing arrangement.

4. A serial peripheral interface device according to claim 1, wherein said queuing arrangement further comprises:

a write counter configured to numerically track any bytes of data that need to be transmitted; and a read counter configured to numerically track any bytes of data that have been received.

5. A serial peripheral interface device according to claim 1, wherein said queuing arrangement further comprises a circular FIFO buffer configured for at least 32 bytes.

6. A serial peripheral interface device according to claim 4, wherein said serial peripheral interface device comprises two interrupt requests configured to facilitate a reduction in polling by a CPU.

7. A serial peripheral interface device according to claim 6, wherein said two interrupt requests comprise a transmit interrupt request configured with a first threshold value and a receive interrupt request configured with a second threshold value.

8. A microcontroller-based data communication device configured with a serial peripheral interface device to provide a high performance buffering scheme for transmitting and receiving data, said serial peripheral interface device comprising:

an input/output control device for interfacing with peripheral devices; and a single buffer having a transmit shift register, a receive shift register, a data register and a queuing arrangement, wherein said queuing arrangement comprises a pointer/counter arrangement and is configured to provide for the receiving of new data in said data register at substantially the same time as stored data is transmitted from said data register, wherein said queuing arrangement comprises:

a write pointer configured to indicate a location in said single buffer where a CPU can write data to be transmitted;

a read pointer configured to identify a location in said single buffer where any received data can be stored for reading by the CPU; and a shift pointer configured to identify a location for data to be transmitted and a location where the received data will be stored after shifting of any registers is completed.

9. A serial peripheral interface device according to claim 8, wherein said queuing arrangement comprises at least one of a circular queuing arrangement and a linear queuing arrangement.

10. A serial peripheral interface device according to claim 8, wherein said queuing arrangement further comprises:

a write counter configured to numerically track any bytes of data that need to be transmitted; and a read counter configured to numerically track any bytes of data that have been received.

11. A serial peripheral interface device according to claim 10, wherein said serial peripheral interface device comprises two interrupt requests configured to facilitate a reduction in polling by a CPU.

12. A serial peripheral interface device according to claim 11, wherein said two interrupt requests comprise a transmit interrupt request configured with a first threshold value and a receive interrupt request configured with a second threshold value.

* * * * *